United States Patent [19]

Chevalier

[11] Patent Number: 4,556,263

[45] Date of Patent: Dec. 3, 1985

[54] SLIDE MECHANISM, IN PARTICULAR FOR AN AUTOMOBILE VEHICLE SEAT

[75] Inventor: Claude Chevalier, Sully sur Loire, France

[73] Assignee: Compagnie Industrielle de Mechanismes en Abrege C.I.M., France

[21] Appl. No.: 477,109

[22] Filed: Mar. 21, 1983

[30] Foreign Application Priority Data

Mar. 31, 1982 [FR] France ................................ 82 05518

[51] Int. Cl.⁴ .............................................. F16C 29/04
[52] U.S. Cl. .................................... 308/6 R; 248/430; 296/65 R
[58] Field of Search ......................... 308/3.6, 3.8, 6 R; 248/429, 430; 296/65 R; 297/318; 312/334, 335, 337, 339, 341 R, 343, 349, 350

[56] References Cited

U.S. PATENT DOCUMENTS

| 2,250,895 | 7/1941 | Premo | 308/3.8 X |
| 2,606,090 | 8/1952 | Straubel | 308/3.8 X |
| 2,715,433 | 8/1955 | Dolgorukov | 308/6 R X |
| 2,794,690 | 6/1957 | Bullock | 308/3.8 |
| 3,013,849 | 12/1961 | Tanner | 308/3.8 X |
| 3,960,413 | 6/1976 | Abbuhl et al. | 308/6 R X |

Primary Examiner—Donald Watkins
Assistant Examiner—David Werner

[57] ABSTRACT

The mechanism has two slides formed by section members 10, 20 having pairs of abutments 11-23, 14-22, which, at the end of the travel, cooperate through the medium of two balls 30 between which is disposed an elastically compressible device 40. The balls are in this way protected against deterioration due to impacts.

7 Claims, 7 Drawing Figures

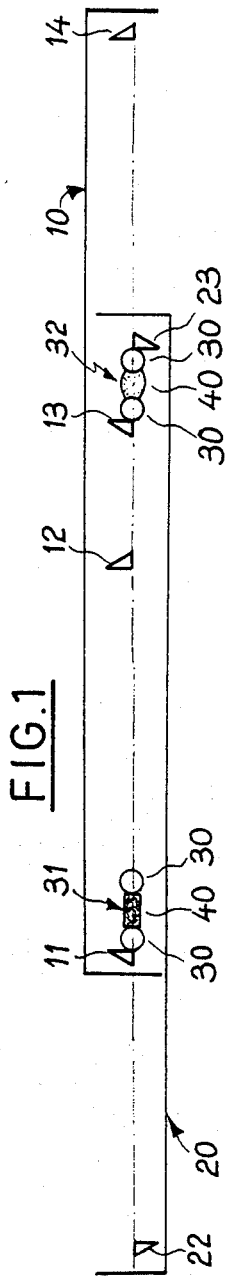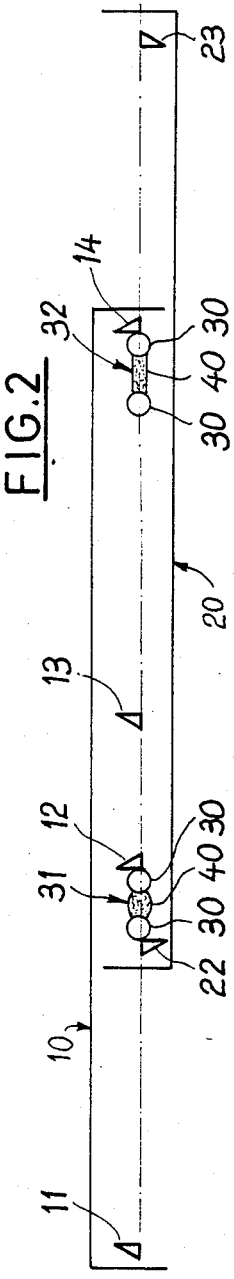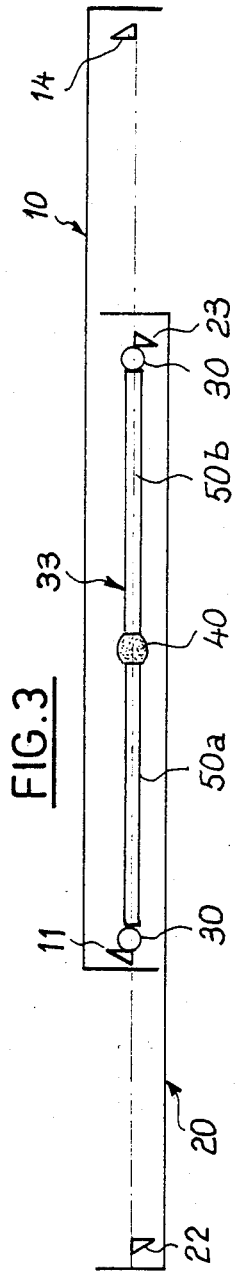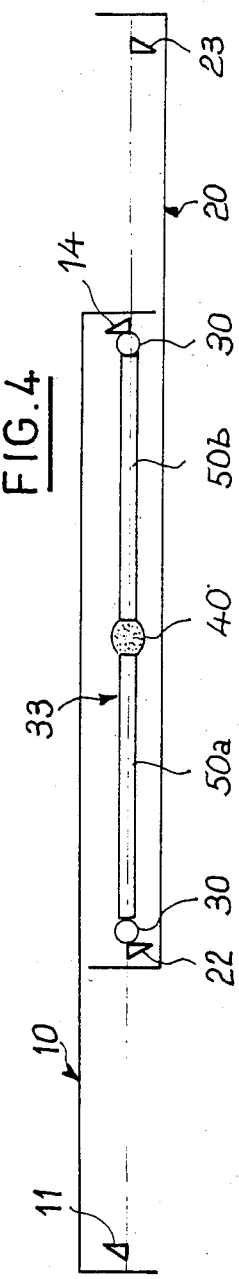

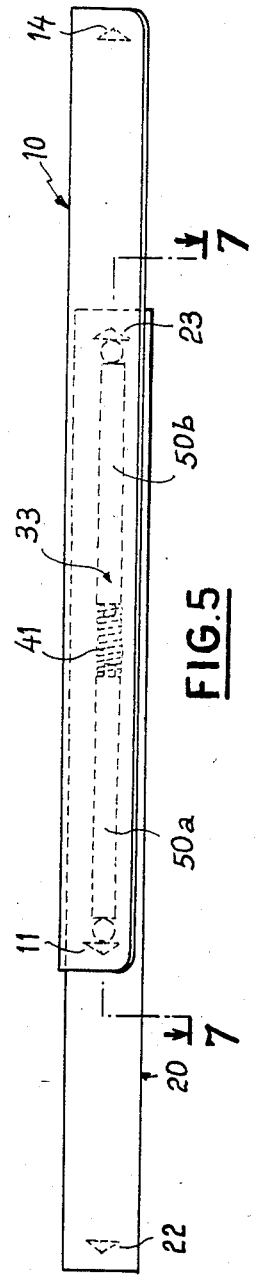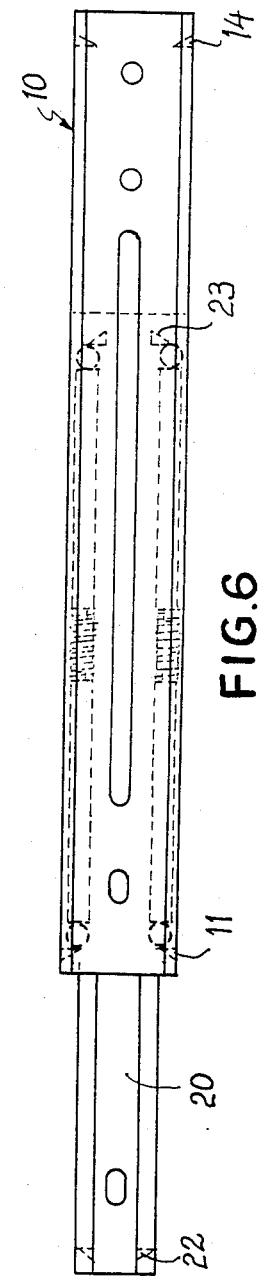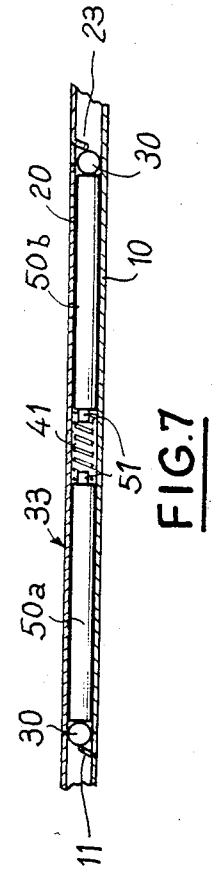

SLIDE MECHANISM, IN PARTICULAR FOR AN AUTOMOBILE VEHICLE SEAT

The present invention relates to a mechanism having slides for interconnecting two units while allowing them a certain amount of freedom to move in translation.

This mechanism, in particular employed for mounting front seats of an automobile, is of the type comprising two U-section members which fit one inside the other in head-to-toe relation with possibility of longitudinal sliding, and abutments respectively carried by each section member, which abutments, at each end of the sliding travel, constitute pairs of abutments which cooperate through the medium of kinematic elements which are rolling or sliding elements and are interposed between the two section members.

In order to bring one slide from one end position to the other relative to the matched slide, the second slide is immobilised and then the first slide is urged in the required direction until the abutments stop the movement. As the driving thrust usually is not controlled, the stoppage occurs after impact or impacts between the travel-limiting abutments, these impacts occurring through kinematic elements. After repeated operations, the succession of impacts on the kinematic elements deforms them and results in a rapid deterioration of the mechanism which brings about, first of all, excessive resistance to the thrust and then possibly purely and simply a jamming of the mechanism.

An object of the invention is to avoid this premature deterioration of the kinematic elements.

The invention therefore provides a slide mechanism of the aforementioned type, wherein the pairs of abutments cooperate furthermore through the medium of elastically compressible means constituting shock absorbers.

In an advantageous embodiment, each pair of abutments cooperates through the medium of two kinematic elements, between which kinematic elements are interposed means which are elastically compressible in the direction of the movement.

In a cheap modification to be envisaged, an elongated spacer member is disposed between each kinematic element and the elastically compressible means.

The invention will be described in more detail hereinafter with reference to the accompanying drawings which are given solely by way of example and in which:

FIGS. 1 and 2 are diagrammatic side elevational views of a first mechanism according to the invention in the two end positions of the slides respectively;

FIGS. 3 and 4 are similar views of a second mechanism according to the invention in the two end positions of the slides respectively;

FIG. 5 is an elevational view of a preferred embodiment of the invention;

FIG. 6 is a plan view of this preferred embodiment of the invention;

FIG. 7 is a detail view of the preferred embodiment showing a pair of abutments which cooperate through the medium of kinematic elements and an elastically compressible means, this view being in section taken along line 7—7 of FIG. 5.

Throughout the Figures, identical elements carry identical reference numerals.

In the three embodiments illustrated in the accompanying drawings, the two slides 10 and 20 are metal members having a generally U section. The lower slide 20, adapted to be fixed to a floor of an automobile, is fitted in head-to-toe relation in the upper slide 10 which is adapted to be fixed under a front seat of the vehicle. The relative sliding of the two slides is facilitated by steel balls 30 interposed between the confronting surfaces of pairs of adjacent flanges of the two U-section members.

At the end of the sliding travel, the balls 30 are stopped by abutments which project, on one hand, from the outer surface of the flanges of the lower slide 20 and, on the other hand, from the inner surface of the flanges of the upper slide 20. These abutments are formed by sheared-and-formed portions produced symmetrically on each flange of the section members.

In the first embodiment (FIGS. 1 and 2), the upper slide 10 has on each flange four abutments 11, 12, 13 and 14 and the lower slide 20 two abutments 22 and 23 also on each flange.

In the second embodiment (FIGS. 3 and 4), and in the preferred embodiment (FIGS. 5 and 6), the upper slide 10 only has the end abutments 11 and 14 on each flange and the lower slide has the two abutments 22 and 23 on each flange, as before.

In the first four Figures, these abutments are shown diagrammatically by triangles having one side horizontal and the apex opposed to this side located above or below this side, depending on whether it concerns an abutment of the upper slide or an abutment of the lower slide.

In the first embodiment (FIGS. 1 and 2), the balls 30 interposed between the confronting surfaces of a pair of adjacent flanges are grouped into two trains 31 and 32, each comprising two balls separated by a plug 40 of elastically yieldable material. The plug 40 has a cylindrical shape whose diameter is slightly less than the diameter of the balls.

In the second embodiment (FIGS. 3 and 4), the balls 30 interposed between the confronting surfaces of a pair of adjacent flanges are two in number and separated by a plug 40 of an elastic material and by two spacer members 50a and 50b which are respectively placed between each ball 30 and the plug 40. The assembly of the balls, plugs and spacer members constitutes a single train 33 movable along the slides. The spacer members 50a and 50b are cylindrical and elongated and have, as the plug, a diameter slightly less than the diameter of the balls.

The preferred embodiment (FIGS. 5 and 6) is a modification of the second embodiment in which the plug 40 is replaced by a coil spring 41 whose axis is parallel to the direction of the movement. This spring has an outside diameter roughly equal to the outside diameter of the spacer members 50a and 50b and fits at each end on a centering spigot 51 provided at the adjacent end of each spacer member.

The end sliding positions of the slides are determined by the cooperation of abutments carried by one and the other slideway respectively:

in the first embodiment, the right end position of the upper slide 10 is determined (FIG. 1) by the abutments 13 and 23 which cooperate through the medium of the train 32 by compressing its elastic plug 40 longitudinally; likewise, the left end position (FIG. 2) is determined by the abutments 12 and 22 which cooperate through the medium of the train 31;

in the second embodiment, the right end position of the upper slide 10 is determined (FIG. 3) by the abutments 11 and 23 which cooperate through the medium of the train 33, whereas the left end position of this upper slide is determined (FIG. 4) by the abutments 14 and 22 which cooperate through the medium of the same train 33, the plug 40 being longitudinally compressed in each case.

Similar phenomena occur in the case of FIGS. 5 to 7 in which it is the spring 41 which is compressed.

According to the invention, the stoppages at the end of the sliding travel are not produced by sudden impacts of the abutments on the balls: the movement is stopped progressively by the compression of the elastic elements 40 or 41. In this way, hammering of the balls is avoided by taking advantage of the available space between the flanges of the two section members.

This shock-absorbing effect is particularly advantageous in the case of electrically controlled slides in which the ends-of-travel must be progressive in order to ensure a long life not only of the slides but also of the driving motors.

Having now described my invention what I claim as new and desire to secure by Letters Patent is:

1. A slide mechanism comprising:
   (a) a pair of generally "U"-shaped slides arranged in sliding, head-to-toe relationship, flanges on each of the slides defining a track between their confronting surfaces;
   (b) at least one pair of abutments formed on each flange and extending into the track;
   (c) at least one pair of ball elements located in each track to facilitate relative sliding of the "U"-shaped slides; and,
   (d) elastically compressible means disposed in the track in contact with and between the at least one pair of ball elements, the compressible means being compressible when acted on by forces in a direction generally parallel to the direction of relative sliding between the two "U"-shaped members.

2. The slide mechanism according to claim 1 wherein the elastically compressible means comprises a plug of solid elastic material between the at least one pair of ball elements, the outer dimensions of the plug being less than the diameter of the ball elements.

3. The slide mechanism according to claim 2 further comprising a spacer member extending between each ball element and the elastically compressible material, each spacer member having a longitudinal axis extending generally parallel to the direction of relative sliding between the two "U"-shaped members.

4. The slide mechanism according to claim 1 further comprising a spacer member extending between each ball element and the elastically compressible means, each spacer member having a longitudinal axis extending generally parallel to the direction of relative sliding between the two "U"-shaped members.

5. The slide mechanism according to claim 4 wherein the elastically compressible means comprises a compression coil spring having a compression axis oriented generally parallel to the direction of relative sliding between the two "U"-shaped members.

6. The slide members according to claim 5 wherein the length of each spacer member is greater than the length of the compression coil spring.

7. The slide member according to claim 6 wherein each spacer member defines a reduced portion on one end which fits within the compression coil spring.

* * * * *